006C 129/08
United States Patent [19]
Douglas et al.

[11] 3,914,306
[45] Oct. 21, 1975

[54] GUANIDINES

[75] Inventors: George H. Douglas, Paoli; Julius Diamond, Lafayette Hill, both of Pa.

[73] Assignee: William H. Rorer, Inc., Fort Washington, Pa.

[22] Filed: July 13, 1973

[21] Appl. No.: 379,085

Related U.S. Application Data

[63] Continuation-in-part of Ser. No. 291,474, Sept. 22, 1972, abandoned.

[52] U.S. Cl. ... 260/562 R; 260/295.5 S; 260/404.5; 260/465 E; 260/501.14; 260/558 R; 260/558 S; 260/565; 424/266; 424/312; 424/316; 424/324; 424/326

[51] Int. Cl.$^2$............ C07C 130/12; C07C 103/20; C07C 129/08

[58] Field of Search ............ 260/562 R, 465 E, 565, 260/295.5 S, 404.5, 501.74

[56] References Cited
OTHER PUBLICATIONS
Chemical Abstracts, Vol. 64 Column 19833(h).

*Primary Examiner*—Gerald A. Schwartz
*Attorney, Agent, or Firm*—James A. Nicholson

[57] ABSTRACT

Novel substituted phenylguanidine compounds and processes for their preparation are disclosed. Their use as anti-hypertensive agents is also revealed.

8 Claims, No Drawings

GUANIDINES

CROSS REFERENCE TO RELATED APPLICATIONS

This is a continuation-in-part of copending application Ser. No. 291,474 filed Sept. 22, 1972 now abandoned.

SUMMARY OF THE INVENTION

This invention describes new substituted phenylguanidine compounds and processes for their preparation. This invention further provides valuable pharmaceutical preparations which contain substituted phenylguanidine compounds which possess an effective degree of antihypertensive properties and exert activities on the cardiovascular system. A method for the treatment of hypertensive disorders by the administration of a substituted phenylguanidine compound is also described.

BACKGROUND OF THE INVENTION

The pharmaceutical compositions which have been used as antihypertensive agents have included such as the thiazides, reserpine, hydralazine, α-methyl dopa, guanethidine and the like. These compounds, however, while being effective produce undesirable side effects such as electrolyte inbalance, orthostatic hypertension, and gastric secretory and spasmolytic properties.

We have unexpectedly found that guanidine compounds exhibit valuable pharmocologic properties.

We have unexpectedly found that the guanidines of this invention are useful antihypertensive agents.

We have also unexpectedly found that guanidines of this invention are also useful intermediates for the preparation of amidinourea compounds which are useful antihypertensive agents.

We have further found that the guanidine compounds of this invention are novel and can easily be prepared.

We have also found that the compounds of this invention have a minimum of the side effects which accompany antihypertensive agents.

We have still further found a simple and effective method for the treatment of cardiovascular disorders such as hypertensive disorders.

DESCRIPTION AND PREFERRED EMBODIMENT

This invention describes a class of novel chemical compounds which comprises a substituted phenyl radical which is further attached to a guanidine chain. This invention also describes the non-toxic pharmaceutically acceptable salts and the method of preparing these substituted phenylguanidine compounds.

The novel compounds of this invention are described by the structural formula I

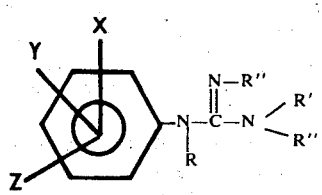

where:

X is hydrogen or halo;
Y is hydrogen, halo, haloloweralkyl, nitro, loweralkyl or loweralkoxy;
Z is haloloweralkyl, haloloweralkoxy or loweralkylsulfonyl;
Z is also halo, loweralkoxy, loweralkyl, nitro or cyano provided X and Y are not both hydrogen at the same time;
R is hydrogen or loweralkyl;
R', R" and R"' are hydrogen, loweralkyl, intermediate alkyl, loweralkenyl, cycloalkyl, cycloalkylloweralkyl, aryl, aralkyl, cycloalkenyl, acyl or aroyl;
R' and R" together are loweralkylidenyl or heteroloweralkylidenyl;
and the non-toxic acid addition salts thereof.

Compounds of this invention which are preferred are described by general formula I where:

X is hydrogen or halo;
Y is hydrogen, halo, loweralkyl or haloloweralkyl; and
Z is halo or loweralkyl, provided X and Y are not both hydrogen, or haloloweralkyl;
R is hydrogen or loweralkyl; and
R', R" and R"' are hydrogen, loweralkyl, cycloalkyl, acyl or aroyl.

The more preferred compounds of this invention include those compounds where:

X is hydrogen, chloro, bromo or fluoro;
Y is hydrogen, chloro, bromo, fluoro, methyl or trifluoromethyl;
Z is chloro provided X and Y are not both hydrogen, bromo provided X and Y are not both hydrogen, fluoro provided X and Y are not both hydrogen, methyl provided X and Y are not both hydrogen, trifluoromethyl;
R is hydrogen or methyl;
R' is hydrogen;
R" is hydrogen, methyl, ethyl, propyl, i-propyl, butyl, cyclopropyl, cyclobutyl, cyclopentyl, cyclohexyl, acetyl, propionyl or benzoyl; and
R"' is hydrogen, methyl, ethyl, acetyl or propionyl.

The most preferred compounds of this invention are described where:

X is hydrogen, chloro, bromo or fluoro;
Y is hydrogen, chloro, bromo, fluoro, methyl or trifluoromethyl;
Z is chloro provided X and Y are not both hydrogen, bromo provided X and Y are not both hydrogen, fluoro provided X and Y are not both hydrogen, methyl provided X and Y are not both hydrogen, or trifluoromethyl;
R is hydrogen or methyl;
R' is hydrogen;
R" is hydrogen, methyl, ethyl, propyl, i-propyl, butyl, acetyl or propionyl; and R"' is hydrogen or acetyl.

A special embodiment of this invention is described where X is hydrogen, Y is 2-chloro and Z is 6-chloro.

Another special embodiment is described where X and Y are hydrogen and Z is 4-fluoro.

A further special embodiment is described where R', R" and R"' are hydrogen, acetyl or propionyl.

In the descriptive portions of this invention, the following definitions apply:

The term "loweralkyl" refers to an alkyl hydrocarbon group containing from 1 to 5 carbon atoms which may be straight chained or branched.

The term "intermediate alkyl" refers to an alkyl hydrocarbon group containing from 6 to 12 carbon atoms which may be straight chained or branched.

The "acyl" radical may be any organic radical derived from an organic acid by its removal of the hydroxyl group such as acetyl, propionyl, etc.

The "aroyl" radical may be any aromatic organic radical derived from an organic acid by its removal of the hydroxyl group such as benzoyl, toluyl, etc.

The "loweralkoxy" radical signifies an alkoxy group containing from 1 to about 6 carbon atoms which can be straight chained or branched.

The "loweralkenyl" group refer to an alkenyl hydrocarbon group containing from 2 to about 6 carbon atoms which may be straight chained or branched.

"Cycloalkyl" refers to a cycloalkyl hydrocarbon ring having from 3 to 8 carbon atoms.

"Cycloalkenyl refers to a cycloalkenyl hydrocarbon ring having from 3 to 8 carbon atoms.

The "loweralkylidenyl" radical refers to an alkylidene hydrocarbon radical containing from 2 to 8 carbon atoms thus forming a ring.

The "heteroloweralkylidenyl" radical refers to an alkylidene hydrocarbon radical containing from 2 to 8 carbon atoms and one or more hetero atoms selected from oxygen, nitrogen and surfur, thus forming a hetero ring.

"Aryl" refers to an aromatic ring preferably phenyl.

This invention further describes a new method for the treatment of cardiovascular disorders by the administration of a therapeutically effective amount of a guanidine compound of formula II

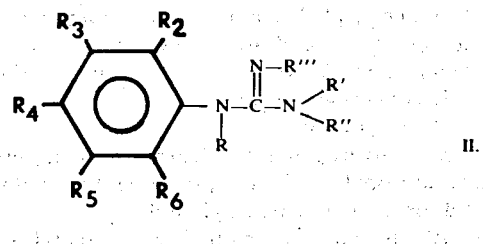

II.

where:
$R_2$, $R_3$, $R_4$, $R_5$ and $R_6$ may be the same or different and are hydrogen, provided at least one of $R_2$, $R_3$, $R_4$, $R_5$ and $R_6$ is other than hydrogen, halo, haloloweralkyl, nitro, cyano, loweralkylsulfonyl, loweralkoxy or loweralkyl;

R, R', R" and R'" are hydrogen, loweralkyl, intermediate alkyl, loweralkenyl, cycloalkyl, cycloalkyllow- eralkyl, aralkyl, cycloalkenyl, acyl, aroyl or aryl;

R' and R" together are loweralkylidenyl or heteroloweralkylidenyl; and the non-toxic acid addition salts thereof.

The preferred compounds which are useful in the treatment of cardiovascular disorders are exemplified by those compounds of formula III

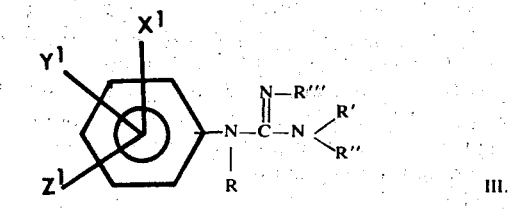

III.

where:
X', Y' and Z' may be the same or different and are hydrogen, provided at least one of X', Y' and Z' is other than hydrogen, halo, haloloweralkyl, nitro, cyano, loweralkylsulfonyl, loweralkoxy or loweralkyl;

R is hydrogen or loweralkyl; and

R', R" and R'" are hydrogen, loweralkyl, cycloalkyl, acyl or aroyl.

The more preferred compounds which are useful in the treatment of cardiovascular disorders are shown in formula III where:
X', Y' and Z' are hydrogen, provided at least one of X', Y' and Z' is other than hydrogen, halo, haloloweralkyl or loweralkyl;

R is hydrogen or methyl;

R' is hydrogen;

R" is hydrogen, methyl, ethyl, propyl, i-propyl, butyl, cyclopropyl, cyclobutyl, cyclopentyl, cyclohexyl, acetyl, propionyl or benzoyl; and R'" is hydrogen, methyl, ethyl, acetyl or propionyl.

The most preferred compounds are described by formula III where:

X' is hydrogen, chloro, bromo or fluoro;

Y' is hydrogen, chloro, bromo, fluoro, methyl or trifluoromethyl;

Z' is chloro, bromo, fluoro, methyl or trifluoromethyl;

R is hydrogen or methyl;

R' is hydrogen;

R" is hydrogen, methyl, ethyl, propyl, i-propyl, butyl, acetyl or propionyl; and R'" is hydrogen or acetyl.

A special embodiment of this invention is described where X' is hydrogen, Y' is 2-chloro and Z' is 6-chloro.

Another special embodiment is described where X' and Y' are hydrogen and Z' is 4-chloro.

A further special embodiment of this invention is described where R, R' and R'" are hydrogen and R" is hydrogen, acetyl or propionyl.

It is well known in the pharmacological arts that non-toxic acid addition salts of pharmacologically active amine compounds do not differ in activities from their free base. The salts merely provide a convenient solubility factor.

The amines of this invention may be readily converted to their non-toxic acid addition salts by customary methods in the art. The non-toxic salts of this invention are those salts the acid component of which is pharmacologically acceptable in the intended dosages, i.e., salts of pharmaceutically acceptable acids; such salts would include those prepared from inorganic acids, organic acids, higher fatty acids, high molecular weight acids, etc., and include such as:

| | |
|---|---|
| hydrochloric acid, | succinic acid, |
| hydrobromic acid, | glycolic acid, |
| sulfuric acid, | lactic acid, |
| nitric acid, | salicylic acid, |
| phosphoric acid, | benzoic acid, |
| methane sulfonic acid, | nicotinic acid, |
| benzene sulfonic acid, | phthalic acid, |
| acetic acid, | stearic acid, |
| propionic acid, | oleic acid, |
| malic acid, | abietic acid, etc. |

Representative compounds of this invention which are particularly useful are as follows:

o-chlorophenylguanidine
m-chlorophenylguanidine
p-chlorophenylguanidine
2,3-dichlorophenylguanidine
2,4-dichlorophenylguanidine 2,5-dichlorophenylguanidine
2,6-dichlorophenylguanidine
3,4-dichlorophenylguanidine
3,5-dichlorophenylguanidine
2,3,4-trichlorophenylguanidine
2,3,5-trichlorophenylguanidine
2,3,6-trichlorophenylguanidine
2,4,5-trichloropheylguanidine
2,4,6-trichlorophenylguanidine
3,4,5-trichlorophenylguanidine
o-bromophenylguanidine
m-bromophenylguanidine
p-bromophenylguanidine
2,3-dibromophenylguanidine
2,4-dibromophenylguanidine
2,5-dibromophenylguanidine
2,6-dibromophenylguanidine
3,4-dibromophenylguanidine
3,5-dibromophenylguanidine
2-chloro-3-bromophenylguanidine
2-chloro-4-bromophenylguanidine
2-chloro-5-bromophenylguanidine
2-chloro-6-bromophenylguanidine
3-chloro-2-bromophenylguanidine
3-chloro-4-bromophenylguanidine
3-chloro-5-bromophenylguanidine
3-chloro-6-bromophenylguanidine
4-chloro-2-bromophenylguanidine
4-chloro-3-bromophenylguanidine
2-fluoro-4-chlorophenylguanidine
2-fluoro-6-chlorophenylguanidine
2-chloro-4-fluorophenylguanidine
2-fluoro-6-bromophenylguanidine
2-bromo-4-fluorophenylguanidine
2-iodo-4-chlorophenylguanidine
2-iodo-6-chlorophenylguanidine
2-chloro-4-iodophenylguanidine
2-iodo-4-bromophenylguanidine
o-fluorophenylguanidine
m-fluorophenylguanidine
p-fluorophenylguanidine
p-iodophenylguanidine
2,4-difluorophenylguanidine
2,5-difluorophenylguanidine
2,6-difluorophenylguanidine
2,4-diiodophenylguanidine
2-iodo-6-bromophenylguanidine
2-bromo-4-iodophenylguanidine
2-fluoro-4-iodophenylguanidine
2-iodo-4-fluorophenylguanidine
2,4-dichloro-6-bromophenylguanidine
2,6-dichloro-4-bromophenylguanidine
2,4-dibromo-6-chlorophenylguanidine
2,6-dibromo-4-chlorophenylguanidine
2,4-dichloro-6-fluorophenylguanidine
2,6-dichloro-4-fluorophenylguanidine
2,5-dichloro-4-fluorophenylguanidine
2,4-dichloro-6-iodophenylguanidine
2,6-dichloro-4-iodophenylguanidine
2,4-dibromo-6-iodophenylguanidine
2,4-dibromo-6-fluorophenylguanidine
2,6-dibromo-4-fluorophenylguanidine
2-chloro-4-bromo-6-fluorophenylguanidine
2-bromo-4-fluoro-6-chlorophenylguanidine
2-bromo-4-chloro-6-fluorophenylguanidine
2-chloro-4-iodo-6-bromophenylguanidine
2,4,6-trifluorophenylguanidine
o-trifluoromethylphenylguanidine
m-trifluoromthylphenylguanidine
p-trifluoromethylphenylguanidine
p-trifluoromethoxyphenylguanidine
p-methylsulfonylphenylguanidine
2-chloro-4-nitrophenylguanidine
2-bromo-4-nitrophenylguanidine
2-iodo-4-nitrophenylguanidine
2-fluoro-4-nitrophenylguanidine
2-nitro-4-chlorophenylguanidine
2-nitro-4-bromophenylguanidine
2-nitro-4-fluorophenylguanidine
2-nitro-4-trifluoromethylphenylguanidine
2-nitro-4-methoxyphenylguanidine
2-cyano-4-chlorophenylguanidine
2-chloro-4-cyanophenylguanidine
2-methyl-4-chlorophenylguanidine
2-methyl-4-bromophenylguanidine
2-methyl-4-fluorophenylguanidine
2-methyl-4-nitrophenylguanidine
2-methyl-4-cyanophenylguanidine
2-methyl-4-trifluoromethylphenylguanidine
2,4-dimethylphenylguanidine
2,6-dimethylphenylguanidine
2,6-dimethyl-4-chlorophenylguanidine
2,6-dimethyl-4-fluorophenylguanidine
2,6-dimethyl-4-bromophenylguanidine
2,6-dimethyl-4-nitrophenylguanidine
2,6-dimethyl-4-trifluoromthylphenylguanidine
2-chloro-4-methylphenylguanidine
2-bromo-4-methylphenylguanidine
2-fluoro-4-methylphenylguanidine
2-nitro-4-methylphenylguanidine
2,6-dichloro-4-methylphenylguanidine
2,4-dichloro-6-nitrophenylguanidine
2,6-dichloro-4-nitrophenylguanidine
2-ethyl-4-nitrophenylguanidine
2-ethyl-4-chlorophenylguanidine
2-ethyl-4-bromophenylguanidine
2-ethyl-4-fluorophenylguanidine
2-ethyl-4-trifluorophenylguanidine
2-cyano-4-methylphenylguanidine
2-trifluoromethyl-4-methylphenylguanidine
2-trifluoromethyl-6-chlorophenylguanidine
4-trifluoromethyl-2-chlorophenylguanidine
4-trifluoromethyl-2-bromophenylguanidine
4-trifluoromethyl-2-fluorophenylguanidine
2,4-dichloro-6-methylphenylguanidine
2,6-dichloro-6-methylphenylguanidine
3,5-ditrifluoromethylphenylguanidine
2,5-difluoromethyl-4-nitrophenylguanidine
2-methoxy-4-nitrophenylguanidine
2,4-dichloro-6-methoxyphenylguanidine The compounds of this invention exert activity on the cardiovascular system. They possess blood-pressure lowering effects and are useful as antihypertensive agents.

For these purposes, the guanidines of this invention can be normally administered orally or parenterally. Orally they may be administered as tablets, aqueous or oily suspensions, dispersible powders or granules, emulsions, hard or soft capsules, or syrups or elixirs.

Compositions intended for oral use may be prepared according to any method known in the art for the manufacture of pharmaceutical compositions and such compositions may contain one or more agents selected from the group consisting of sweetening agents, flavoring agents, coloring agents, preserving agents and the like, in order to provide a pharmaceutically elegant and palatable preparation.

The dosage regimen in carrying out the methods of this invention is that which insures maximum therapeutic response until improvement is obtained and thereafter the minimum effective level which gives relief. Thus, in general, the dosages are those that are therapeutically effective in the alleviation of hypertensive disorders. In general, the daily dose can be between about 0.05 mg/kg/day and 70 mg/kg/day (preferably in the range of 1–25 mg/kg/day), bearing in mind, of course, that in selecting the appropriate dosage in any specific case, consideration must be given to the patient's weight, general health, age, and other factors which may influence response to the drug.

Various tests in animals have been carried out to show the ability of the compounds of this invention to exhibit reactions that can be correlated with activity in humans.

One such test is the ability of the compound to lower blood pressure in the spontaneous hypertensive rat (Ryo Tabei, et al., Clin. Pharm. & Therap. 11: 269–274, 1970). Blood pressure measurements are recorded by both the tail cuff method and by direct cannulation of a common carotid artery. Compounds that are effective antihypertensives in man have been shown to be active in lowering blood pressure in this animal model. In view of the results of this test, the guanidines of this invention can be considered to be active antihypertensive agents.

The compounds of this invention are also useful as intermediates for the preparation of pharmaceutically active agents. Thus, for example, the compounds of this invention may be used to prepare those pharmaceutically active amidinourea compounds disclosed in copending application U.S. Ser. No. 291,474 described above.

The compounds of this invention may be prepared by the following general synthesis:

Condensation of cyanamide and a substituted aniline results in the corresponding substituted phenylguanidine.

The reaction is preferably carried out on the aniline salt either in a polar medium or neat and using increased temperatures. The salt used may be any acid addition amine salt but preferably the salt of a mineral acid. The polar medium may be aqueous, partially aqueous or a non-aqueous solution. It is convenient to choose a solvent that will reflux at the desired reaction temperture. The more preferred solvents are water or alcohol but other solvents may be used such as DMSO, diethyleneglycol, ethyleneglycol, tetrahydrofuran, dimethylformamide, etc. The most preferred solvent is a mildly acidic solvent which is non-nucleophilic such as phenol, cresol, xylenol, etc. The reaction should also be carried out at a temperature which is high enough so that condensation takes place readily, but not sufficient to decompose the guanidine formed. The reaction temperature can vary from room temperature to about 250°C although it is preferable to run the reaction at temperatures from about 50°C to 150°C. The guanidine salt which is formed can be converted to the free base with a metal hydroxide or alkoxide solution. The isolation of the desired guanidine can be carried out by any method known in the art.

When R substitution is desired, it is convenient to carry out the condensation using the appropriately N-substituted aniline. Thus, for example, N-methyl-2,6-dichloroaniline would result in the 1-(2,6-dichlorophenyl)-1-methylguanidine.

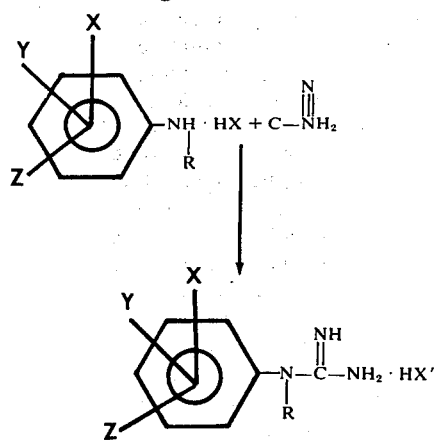

The following reaction equations illustrate this synthesis:

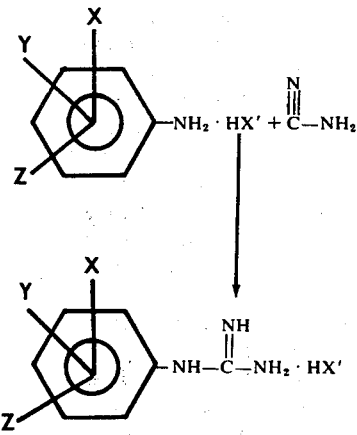

where:
HX' is a mineral acid.

When R' and/or R'' substitution is desired, it is convenient to carry out the condensation using the appropriately substituted cyanamide. Thus, for example, ethyl or diethylcyanamide condensed with 2,6-dichloroaniline would result in the corresponding 1-(2,6-dichlorophenyl)-3-diethylguanidine.

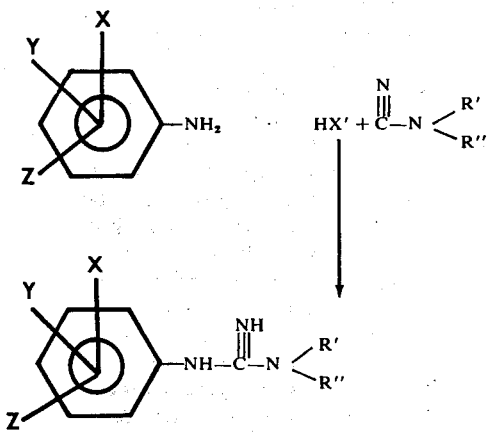

Condensation of an aniline with benzoylthiourea results in the 1-substitutedphenyl-3-benzoylthiourea. This may then be hydrolyzed to the 1-substitutedphenylthiourea and treated with iodomethane to obtain the 1-substitutedphenyl-2-methylpseudothiouronium iodide. When the latter is treated with an amine of the formula NHR′R″, the resultant displacement yields the 1-substitutedphenyl-3-R′R″ guanidine.

Condensation may also take place between an aniline and a substituted pseudothiourea under the above reaction conditions

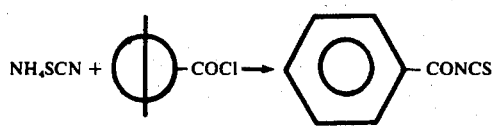

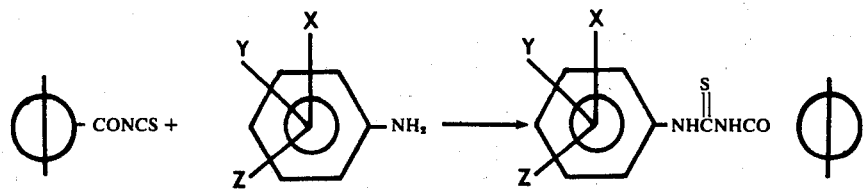

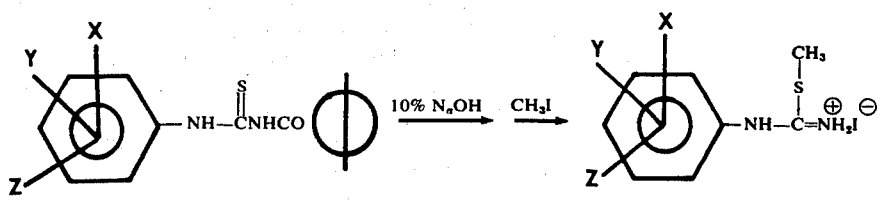

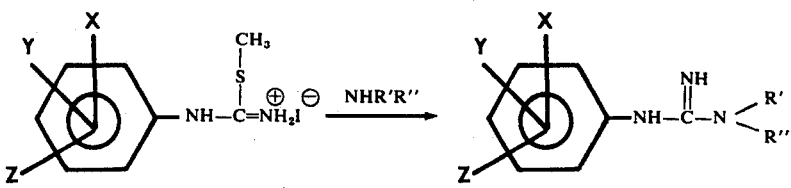

When the above benzoyl group is replaced by any R‴ group condensation with the desired aniline results in a 1-substitutedphenyl-3-R‴ thiourea. Treatment with iodomethane gives the 1-substitutedphenyl-2-methyl-3-R‴ pseudothiouronium iodide. Replacement with an amine of the formula NHR′R″ results in the 1-substitutedphenyl-2-R‴-3-R′, R″ guanidine.

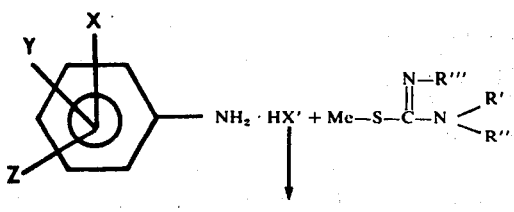

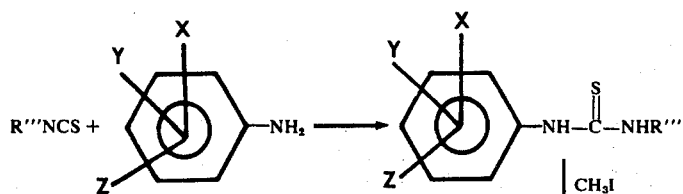

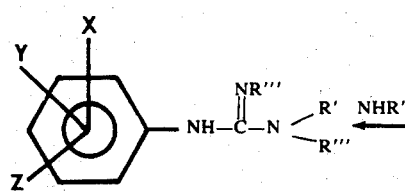
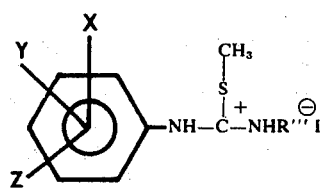

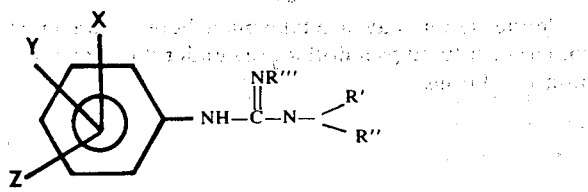

These compounds may also be prepared by reacting the desired aniline with an R', R'' substituted thiocyanate to form the thioguanidine. This is then reacted with a loweralkyl iodide to form the thiouronium salt and condensation with an amine of the formula NHR''' results in the desired guanidine.

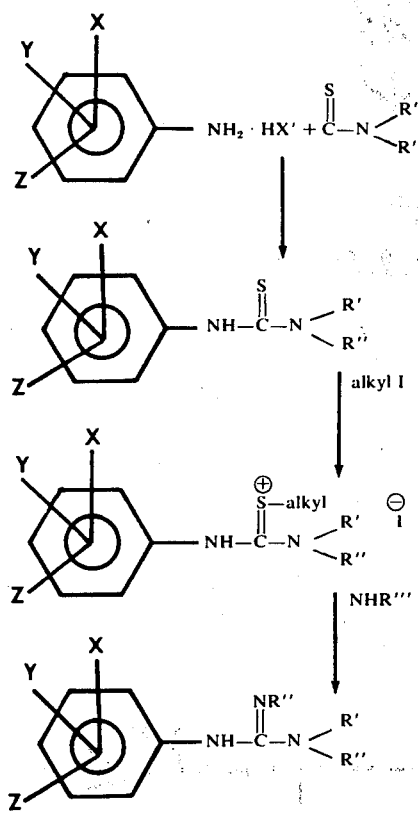

Treatment of a 1-substitutedphenylguanidine with an anhydride affords the diacylguanidine. Selective hydrolysis with acid yields the 1-substitutedphenyl-3-acyl guanidine.

Appropriately desired end products having various X, Y and Z substituents may be prepared at various steps of synthesis using suitable reactions in order to convert one group to another.

The starting anilines are either known, may be prepared by known techniques or reference to the preparation is shown. Thus, chlorination or bromination of an acetanilide or aniline may be carried out in acetic acid, or in the presence of a small amount of iodine dissolved in an inert solvent such as carbon tetrachloride. A solution of chlorine or bromine is then added while the temperature is held near 0°C. Iodination may also be carried out by known methods using iodine monochloride (Cl I).

Alkylation may be carried out on an acetanilide using an alkyl halide and aluminum chloride under Friedel-Crafts conditions to obtain desired alkyl substitution.

Nitration may be carried out using fuming nitric acid at about 0°C.

A nitro compound may be hydrogenated to the corresponding amine which may then be diazotized and heated in an alcohol medium to form the alkoxy compound.

An amino compound may also be diazotized to the diazonium fluoroborate which is then thermally decomposed to the fluoro compound. Diazotization followed by a Sandmeyer type reaction may yield the bromo, chloro or iodo compound.

Diazotization of an amino compound followed by addition of cuprous cyanide may result in the desired cyano compound.

When an amino compound is diazotized followed by reaction with potassium ethylxanthate and then hydrolyzed, the mercapto compound results. This in turn may be alkylated to the alkylthio group which is then oxidized to the corresponding alkylsulfonyl substituent.

A halo compound in which halo is chloro or bromo or iodo may be reacted with cuprous cyanide in guanidine at about 150°C to produce a cyano compound.

A chloro, bromo or iodo compound may also be reacted with trifluoromethyliodide and copper powder at about 150°C in dimethylformamide to obtain a trifluoromethyl compound [Tetrahedron Letters:47, 4095 (1959)].

A halo compound may also be reacted with cuprous methanesulfinate in quinoline at about 150°C to obtain a methylsulfonyl compound.

Of course, the above reactions may also be carried out on acetophenone in order to direct substitution. Formation of an oxime followed by Beckmann Rearrangement results in the acetamide which is then deacylated to the aniline.

Reactions may also be carried out on the substituted anilines which would result in di- an tri- substituted anilines.

Reactions may also be carried out at other stages of synthesis depending on the substituents present and the substituents desired and various combinations of the foregoing reactions will be determined by one skilled in the art in order that the desired product results. Thus, a phenylguanidine may be halogenated or nitrated as above, etc.

The following are detailed examples which show the preparation of the compounds of this invention. They are to be construed as illustrations of said compounds and not as limitations thereof.

EXAMPLE 1

2,6-Dichlorophenylguanidine

To 51 g (0.315 mole) of 2,6-dichloroaniline is added 0.4 mole of ethereal HCl and 200 ml of m-cresol. The mixture is then stirred and heated on a steam bath to drive off the ether and excess hydrogen chloride. To the resultant mixture is then added 13.3 g (0.315 mole) of cyanamide then heated for 2 hours on a steam bath. The reaction mixture is then cooled, added to 150 ml of conc. sodium hydroxide solution, cooled and extracted with 2 liters of ether. The ether layer is washed with 2 × 1 liter of water, dried over sodium sulfate, charcoaled and evaporated. The residue is triturated with hexane and the precipitate is filtered off and washed with ether and dried to obtain 2,6-dichlorophenylguanidine hydrochloride.

The free base is prepared by dissolving 2,6-dichlorophenylguanidine hydrochloride in 10% sodium hydroxide solution and extracting with ether. The ether is dried and evaporated to dryness to obtain 2,6-dichlorophenylguanidine.

When the above procedures are followed using the amines of Table I, below, then the corresponding product of Table II, below, is prepared.

| TABLE I | TABLE II |
| --- | --- |
| o-chloroaniline | o-chlorophenylguanidine |
| m-chloroaniline | m-chlorophenylguanidine |
| p-chloroaniline | p-chlorophenylguanidine |
| 2,3-dichloroaniline | 2,3-dichlorophenylguanidine |
| 2,4-dichloroaniline | 2,4-dichlorophenylguanidine |
| 2,5-dichloroaniline | 2,5-dichlorophenylguanidine |
| 3,4-dichloroaniline | 3,4-dichlorophenylguanidine |
| 3,5-dichloroaniline | 3,5-dichlorophenylguanidine |
| 2,3,4-trichloroaniline | 2,3,4-trichlorophenylguanidine |
| 2,3,5-trichloroaniline | 2,3,5-trichlorophenylguanidine |
| 2,3,6-trichloroaniline | 2,3,6-trichlorophenylguanidine |
| 2,4,5-trichloroaniline | 2,4,5-trichlorophenylguanidine |
| 2,4,6-trichloroaniline | 2,4,6-trichlorophenylguanidine |
| 3,4,5-trichloroaniline | 3,4,5-trichlorophenylguanidine |
| o-bromoaniline | o-bromophenylguanidine |
| m-bromoaniline | m-bromophenylguanidine |
| p-bromoaniline | p-bromophenylguanidine |
| 2,3-dibromoaniline | 2,3-dibromophenylguanidine |
| 2,4-dibromoaniline | 2,4-dibromophenylguanidine |
| 2,5-dibromoaniline | 2,5-dibromophenylguanidine |
| 2,6-dibromoaniline | 2,6-dibromophenylguanidine |
| 3,4-dibromoaniline | 3,4-dibromophenylguanidine |
| 3,5-dibromoaniline | 3,5-dibromophenylguanidine |
| 2-chloro-3-bromoaniline | 2-chloro-3-bromophenylguanidine |
| 2-chloro-4-bromoaniline | 2-chloro-4-bromophenylguanidine |
| 2-chloro-5-bromoaniline | 2-chloro-5-bromophenylguanidine |
| 2-chloro-6-bromoaniline | 2-chloro-6-bromophenylguanidine |
| 3-chloro-2-bromoaniline | 3-chloro-2-bromophenylguanidine |
| 3-chloro-4-bromoaniline | 3-chloro-4-bromophenylguanidine |
| 3-chloro-5-bromoaniline | 3-chloro-5-bromophenylguanidine |
| 3-chloro-6-bromoaniline | 3-chloro-6-bromophenylguanidine |
| 4-chloro-2-bromoaniline | 4-chloro-2-bromophenylguanidine |
| 4-chloro-3-bromoaniline | 4-chloro-3-bromophenylguanidine |
| 2-fluoro-4-chloroaniline | 2-fluoro-4-chlorophenylguanidine |
| 2-fluoro-6-chloroaniline | 2-fluoro-6-chlorophenylguanidine |
| 2-chloro-4-fluoroaniline | 2-chloro-4-fluorophenylguanidine |
| 2-fluoro-6-bromoaniline | 2-fluoro-6-bromophenylguanidine |
| 2-bromo-4-fluoroaniline | 2-bromo-4-fluorophenylguanidine |
| 2-iodo-4-chloroaniline | 2-iodo-4-chlorophenylguanidine |
| 2-iodo-6-chloroaniline | 2-iodo-6-chlorophenylguanidine |
| 2-chloro-4-iodoaniline | 2-chloro-4-iodophenylguanidine |
| 2-iodo-4-bromoaniline | 2-iodo-4-bromophenylguanidine |
| o-fluoroaniline | o-fluorophenylguanidine |
| m-fluoroaniline | m-fluorophenylguanidine |
| p-fluoroaniline | p-fluorophenylguanidine |
| p-iodoaniline | p-iodophenylguanidine |
| 2,4-difluoroaniline | 2,4-difluorophenylguanidine |
| 2,5-difluoroaniline | 2,5-difluorophenylguanidine |
| 2,6-difluoroaniline | 2,6-difluorophenylguanidine |
| 2,4-diiodoaniline | 2,4-diiodophenylguanidine |
| 2-iodo-6-bromoaniline | 2-iodo-6-bromophenylguanidine |
| 2-bromo-4-iodoaniline | 2-bromo-4-iodophenylguanidine |
| 2-fluoro-4-iodoaniline | 2-fluoro-4-iodophenylguanidine |
| 2-iodo-4-fluoroaniline | 2-iodo-4-fluorophenylguanidine |
| o-trifluoromethylaniline | o-trifluoromethylphenylguanidine |
| m-trifluoromethylaniline | m-trifluoromethylphenylguanidine |
| p-trifluoromethylaniline | p-trifluoromethylphenylguanidine |
| p-trifluoromethoxyaniline | p-trifluoromethoxyphenylguanidine |
| p-methylsulfonylaniline | p-methylsulfonylphenylguanidine |
| o-nitroaniline | o-nitrophenylguanidine |
| m-nitroaniline | m-nitrophenylguanidine |
| p-nitroaniline | p-nitrophenylguanidine |
| 2-chloro-4-nitroaniline | 2-chloro-4-nitrophenylguanidine |
| 2-bromo-4-nitroaniline | 2-bromo-4-nitrophenylguanidine |
| 2-iodo-4-nitroaniline | 2-iodo-4-nitrophenylguanidine |
| 2-fluoro-4-nitroaniline | 2-fluoro-4-nitrophenylguanidine |
| 2-nitro-4-chloroaniline | 2-nitro-4-chlorophenylguanidine |
| 2-nitro-4-bromoaniline | 2-nitro-4-bromophenylguanidine |
| 2-nitro-4-fluoroaniline | 2-nitro-4-fluorophenylguanidine |
| 2-nitro-4-trifluoromethylaniline | 2-nitro-4-trifluoromethylphenylguanidine |
| 2-nitro-4-methoxyaniline | 2-nitro-4-methoxyphenylguanidine |
| 2-cyano-4-chloroaniline | 2-cyano-4-chlorophenylguanidine |
| 2-chloro-4-cyanoaniline | 2-chloro-4-cyanophenylguanidine |
| 2-methyl-4-chloroaniline | 2-methyl-4-chlorophenylguanidine |
| 2-methyl-4-bromoaniline | 2-methyl-4-bromophenylguanidine |
| 2-methyl-4-fluoroaniline | 2-methyl-4-fluorophenylguanidine |
| 2-chloro-4-methylaniline | 2-chloro-4-methylphenylguanidine |
| 2-fluoro-4-methylaniline | 2-fluoro-4-methylphenylguanidine |
| 2-cyano-4-methylaniline | 2-cyano-4-methylphenylguanidine |
| 2-trifluoromethyl-4-methylaniline | 2-trifluoromethyl-4-methylphenylguanidine |
| 2-methyl-4-nitroaniline | 2-methyl-4-nitrophenylguanidine |
| 2-methyl-4-cyanoaniline | 2-methyl-4-cyanophenylguanidine |
| 2-methyl-4-trifluoromethylaniline | 2-methyl-4-trifluoromethylphenylguanidine |
| 2-chloro-6-nitroaniline | 2-chloro-6-nitrophenylguanidine |
| 2-bromo-6-nitroaniline | 2-bromo-6-nitrophenylguanidine |
| 2-iodo-6-nitroaniline | 2-iodo-6-nitrophenylguanidine |
| 2-fluoro-6-nitroaniline | 2-fluoro-6-nitrophenylguanidine |
| 2-nitro-6-trifluoromethylaniline | 2-nitro-6-trifluoromethylphenylguanidine |

| TABLE I | TABLE II -Continued |
|---|---|
| 2-nitro-6-methoxyaniline | 2-nitro-6-methoxyphenylguanidine |
| 2-cyano-6-chloroaniline | 2-cyano-6-chlorophenylguanidine |
| 2-methyl-6-chloroaniline | 2-methyl-6-chlorophenylguanidine |
| 2-methyl-6-bromoaniline | 2-methyl-6-bromophenylguanidine |
| 2-methyl-6-fluoroaniline | 2-methyl-6-fluorophenylguanidine |
| 2-methyl-6-nitroaniline | 2-methyl-6-nitrophenylguanidine |
| 2-methyl-6-trifluoromethylaniline | 2-methyl-6-trifluoromethylphenylguanidine |
| 2-methyl-6-cyanoaniline | 2-methyl-6-cyanophenylguanidine |
| 2-methyl-6-methylsulfonylaniline | 2-methyl-6-methylsulfonylphenylguanidine |
| 2,4-dimethylaniline | 2,4-dimethylphenylguanidine |
| 2,6-dimethylaniline | 2,6-dimethylphenylguanidine |
| 2-trifluoromethyl-6-chloroaniline | 2-trifluoromethyl-6-chlorophenylguanidine |
| 2-trifluoromethyl-6-bromoaniline | 2-trifluoromethyl-6-bromophenylguanidine |
| 2-trifluoromethyl-6-fluoroaniline | 2-trifluoromethyl-6-fluorophenylguanidine |
| 2-trifluoromethyl-6-nitroaniline | 2-trifluoromethyl-6-nitrophenylguanidine |
| 2-trifluoromethyl-4-chloroaniline | 2-trifluoromethyl-4-chlorophenylguanidine |
| 2-trifluoromethyl-4-bromoaniline | 2-trifluoromethyl-4-bromophenylguanidine |
| 2-trifluoromethyl-4-fluoroaniline | 2-trifluoromethyl-4-fluorophenylguanidine |
| 4-trifluoromethyl-2-chloroaniline | 4-trifluoromethyl-2-chlorophenylguanidine |
| 4-trifluoromethyl-2-bromoaniline | 4-trifluoromethyl-2-bromophenylguanidine |
| 4-trifluoromethyl-2-fluoroaniline | 4-trifluoromethyl-2-bromophenylguanidine |
| 2,4-dichloro-6-methylaniline | 2,4-dichloro-6-methylphenylguanidine |
| 2,6-dichloro-4-methylaniline | 2,6-dichloro-4-methylphenylguanidine |
| 3,5-ditrifluoromethylaniline | 3,5-ditrifluoromethylphenylguanidine |
| 2-methoxy-4-nitroaniline | 2-methoxy-4-nitrophenylguanidine |
| 2-trifluoromethyl-4-nitroaniline | 2-trifluoromethyl-4-nitrophenylguanidine |
| 2,4-dichloro-6-methoxyaniline | 2,4-dichloro-6-methoxyphenylguanidine |
| 2,6-dimethyl-4-chloroaniline | 2,6-dimethyl-4-chlorophenylguanidine |
| 2,6-dimethyl-4-fluoroaniline | 2,6-dimethyl-4-fluorophenylguanidine |
| 2,6-dimethyl-4-bromoaniline | 2,6-dimethyl-4-bromophenylguanidine |
| 2,6-dimethyl-4-nitroaniline | 2,6-dimethyl-4-nitrophenylguanidine |
| 2,6-dimethyl-4-trifluoromethyl-aniline | 2,6-dimethyl-4-trifluoromethylphenyl-guanidine |
| 2-ethyl-4-nitroaniline | 2-ethyl-4-nitrophenylguanidine |
| 2-ethyl-4-chloroaniline | 2-ethyl-4-chlorophenylguanidine |
| 2-ethyl-4-bromoaniline | 2-ethyl-4-bromophenylguanidine |
| 2-ethyl-4-fluoroaniline | 2-ethyl-4-fluorophenylguanidine |
| 2-ethyl-4-trifluoromethylaniline | 2-ethyl-4-trifluoromethylphenylguanidine |
| 2-ethyl-4-cyanoaniline | 2-ethyl-4-cyanophenylguanidine |
| 2-ethyl-4-methylsulfonylaniline | 2-ethyl-4-methylsulfonylphenylguanidine |
| 2,4-dichloro-6-bromoaniline | 2,4-dichloro-6-bromophenylguanidine |
| 2,6-dichloro-4-bromoaniline | 2,6-dichloro-4-bromophenylguanidine |
| 2,4-dibromo-6-chloroaniline | 2,4-dibromo-6-chlorophenylguanidine |
| 2,6-dibromo-4-chloroaniline | 2,6-dibromo-4-chlorophenylguanidine |
| 2,4-dichloro-6-fluoroaniline | 2,4-dichloro-6-fluorophenylguanidine |
| 2,6-dichloro-4-fluoroaniline | 2,6-dichloro-4-fluorophhenylguanidine |
| 2,5-dichloro-4-fluoroaniline | 2,5-dichlorophenylguanidine |
| 2,4-dichloro-6-iodoaniline | 2,4-dichloro-6-iodophenylguanidine |
| 2,6-dichloro-4-iodoaniline | 2,6-dichloro-4-iodophenylguanidine |
| 2,4-dibromo-6-iodoaniline | 2,4-dibromo-6-iodophenylguanidine |
| 2,4-dibromo-6-fluoroaniline | 2,4-dibromo-6-fluorophenylguanidine |
| 2,6-dibromo-4-fluoroaniline | 2,6-dibromo-4-fluorophenylguanidine |
| 2-chloro-4-bromo-6-fluoroaniline | 2,chloro-4-bromo-6-fluorophenylguanidine |
| 2-bromo-4-fluoro-6-chloroaniline | 2-bromo-4-fluoro-6-chlorophenylguanidine |
| 2-bromo-4-chloro-6-fluoroaniline | 2-bromo-4-chloro-6-fluorophenylguanidine |
| 2-chloro-4-iodo-6-bromoaniline | 2-chloro-4-iodo-6-bromophenylguanidine |
| 2,4,6-tribromoaniline | 2,4,6-tribromophenylguanidine |
| 2,4,6-trifluoroaniline | 2,4,6-trifluorophenylguanidine |

EXAMPLE 2

1-(2,6-Dichlorophenyl)-1-methylguanidine

To 55.4 g (0.315 mole) of N-methyl-2,6-dichloroaniline is added 0.4 mole of ethereal HCl and 200 ml of m-cresol. The mixture is then stirred and heated on a steam bath to drive off the ether and excess hydrogen chloride. To the resultant mixture is then added 13.3 g (0.315 mole) of cyanamide then heated 2 hours on a steam bath. The reaction mixture is then cooled, added to 150 ml of conc. sodium hydroxide solution, cooled and extracted with 2 liters of ether. The ether layer is washed with 2 × 1 liter of water, dried over sodium sulfate, charcoaled and evaporated. The residue is triturated with hexane and the precipitate is filtered off and washed with ether and dried to obtain 1-(2,6-dichlorophenyl)-1-methylguanidine hydrochloride.

The free base is prepared by dissolving 1-(2,6-dichlorophenyl)-1-methylguanidine hydrochloride in 10% sodium hydroxide solution and extracting with ether. The ether is dried and evaporated to dryness to obtain 1-(2,6-dichlorophenyl)-1-methylguanidine.

When the N-methylaniline in the above procedures are replaced by the N-loweralkylanilines of this invention then the corresponding product is obtained.

When the above procedures are followed using the representative amines of Table I, below, then the corresponding product of Table II, below, is prepared.

TABLE I

| | |
|---|---|
| N-methyl-o-chloroaniline | 1-(o-chlorophenyl)-1-methylguanidine |
| N-methyl-m-chloroaniline | 1-(m-chlorophenyl)-1-methylguanidine |
| N-methyl-p-chloroaniline | 1-(p-chlorophenyl)-1-methylguanidine |
| N-methyl-2,3-dichloroaniline | 1-(2,3-dichlorophenyl)-1-methylguanidine |
| N-methyl-2,4-dichloroaniline | 1-(2,4-dichlorophenyl)-1-methylguanidine |
| N-methyl-2,5-dichloroaniline | 1-(2,5-dichlorophenyl)-1-methylguanidine |
| N-methyl-3,4-dichloroaniline | 1-(3,4-dichlorophenyl)-1-methylguanidine |
| N-methyl-3,5-dichloroaniline | 1-(3,5-dichlorophenyl)-1-methylguanidine |

TABLE I -Continued

| | |
|---|---|
| N-methyl-2,3,4-trichloroaniline | 1-(2,3,4-trichlorophenyl)-1-methylguanidine |
| N-methyl-2,3,5-trichloroaniline | 1-(2,3,5-trichlorophenyl)-1-methylguanidine |
| N-methyl-2,3,6-trichloroaniline | 1-(2,3,6-trichlorophenyl)-1-methylguanidine |
| N-methyl-2,4,5-trichloroaniline | 1-(2,4,5-trichlorophenyl)-1-methylguanidine |
| N-methyl-2,4,6-trichloroaniline | 1-(2,4,6-trichlorophenyl)-1-methylguanidine |
| N-methyl-3,4,5-trichloroaniline | 1-(3,4,5-trichlorophenyl)-1-methylguanidine |
| N-methyl-p-bromoaniline | 1-(p-bromophenyl)-1-methylguanidine |
| N-methyl-2,4-dibromoaniline | 1-(2,4-dibromophenyl)-1-methylguanidine |
| N-methyl-2-chloro-4-bromoaniline | 1-(2-chloro-4-bromophenyl)-1-methylguanidine |
| N-methyl-2-chloro-6-bromoaniline | 1-(2-chloro-6-bromophenyl)-1-methylguanidine |
| N-methyl-3-chloro-4-bromoaniline | 1-(3-chloro-4-bromophenyl)-1-methylguanidine |
| N-methyl-3-chloro-5-bromoaniline | 1-(3-chloro-5-bromophenyl)-1-methylguanidine |
| N-methyl-4-chloro-2-bromoaniline | 1-(4-chloro-2-bromophenyl)-1-methylguanidine |
| N-methyl-2-fluoro-4-chloroaniline | 1-(2-fluoro-4-chlorophenyl)-1-methylguanidine |
| N-methyl-2-fluoro-6-chloroaniline | 1-(2-fluoro-6-chlorophenyl)-1-methylguanidine |
| N-methyl-2-chloro-4-fluoroaniline | 1-(2-chloro-4-fluorophenyl)-1-methylguanidine |
| N-methyl-2-fluoro-6-bromoaniline | 1-(2-fluoro-6-bromophenyl)-1-methylguanidine |
| N-methyl-2-bromo-4-fluoroaniline | 1-(2-bromo-4-fluorophenyl)-1-methylguanidine |
| N-methyl-2-iodo-4-chloroaniline | 1-(2-iodo-4-chlorophenyl)-1-methylguanidine |
| N-methyl-2-iodo-6-chloroaniline | 1-(2-iodo-6-chlorophenyl)-1-methylguanidine |
| N-methyl-2-chloro-4-iodoaniline | 1-(2-chloro-4-iodophenyl)-1-methylguanidine |
| N-methyl-2-iodo-4-bromoaniline | 1-(2-iodo-4-bromophenyl)-1-methylguanidine |
| N-methyl-o-fluoroaniline | 1-(o-fluorophenyl)-1-methylguanidine |
| N-methyl-m-fluoroaniline | 1-(m-fluorophenyl)-1-methylguanidine |
| N-methyl-p-fluoroaniline | 1-(p-fluorophenyl)-1-methylguanidine |
| N-methyl-p-iodoaniline | 1-(p-iodophenyl)-1-methylguanidine |
| N-methyl-2,4-difluoroaniline | 1-(2,4-difluorophenyl)-1-methylguanidine |
| N-methyl-2,6-difluoroaniline | 1-(2,6-difluorophenyl)-1-methylguanidine |
| N-methyl-2-fluoro-4-iodoaniline | 1-(2-fluoro-4-iodophenyl)-1-methylguanidine |
| N-methyl-o-trifluoromethylaniline | 1-(o-trifluoromethylphenyl)-1-methylguanidine |
| N-methyl-m-trifluoromethylaniline | 1-(m-trifluoromethylphenyl)-1-methylguanidine |
| N-methyl-p-trifluoromethylaniline | 1-(p-trifluoromethylphenyl)-1-methylguanidine |
| N-methyl-p-methylsulfonylaniline | 1-(p-methylsulfonylphenyl)-1-methylguanidine |
| N-methyl-p-nitroaniline | 1-(p-nitrophenyl)-1-methylguanidine |
| N-methyl-2-methyl-6-chloroaniline | 1-(2-methyl-6-chlorophenyl)-1-methylguanidine |
| N-methyl-2-methyl-6-bromoaniline | 1-(2-methyl-6-bromophenyl)-1-methylguanidine |
| N-methyl-2-methyl-6-fluoroaniline | 1-(2-methyl-6-fluorophenyl)-1-methylguanidine |
| N-methyl-2-methyl-6-nitroaniline | 1-(2-methyl-6-nitrophenyl)-1-methylguanidine |
| N-methyl-2-methyl-6-trifluoromethylaniline | 1-(2-methyl-6-trifluoromethylphenyl)-1-methylguanidine |
| N-methyl-2-methyl-6-cyanoaniline | 1-(2-methyl-6-cyanophenyl)-1-methylguanidine |
| N-methyl-2,4-dimethylaniline | 1-(2,4-dimethylphenyl)-1-methylguanidine |
| N-methyl-2,6-dimethylaniline | 1-(2,6-dimethylphenyl)-1-methylguanidine |
| N-methyl-2-trifluoromethyl-6-chloroaniline | 1-(2-trifluoromethyl-6-chlorophenyl)-1-methylguanidine |
| N-methyl-2-trifluoromethyl-6-bromoaniline | 1-(2-trifluoromethyl-6-bromophenyl)-1-methylguanidine |
| N-methyl-2-trifluoromethyl-6-fluoroaniline | 1-(2-trifluoromethyl-6-fluorophenyl)-1-methylguanidine |
| N-methyl-2-trifluoromethyl-4-chloroaniline | 1-(2-trifluoromethyl-4-chlorophenyl)-1-methylguanidine |
| N-methyl-2-trifluoromethyl-4-bromoaniline | 1-(2-trifluoromethyl-4-bromophenyl)-1-methylguanidine |
| N-methyl-2-trifluoromethyl-4-fluoroaniline | 1-(2-trifluoromethyl-4-fluorophenyl)-1-methylguanidine |
| N-methyl-4-trifluoromethyl-2-chloroaniline | 1-(4-trifluoromethyl-2-chlorophenyl)-1-methylguanidine |
| N-methyl-4-trifluoromethyl-2-bromoaniline | 1-(4-trifluoromethyl-2-bromophenyl)-1-methylguanidine |
| N-methyl-4-trifluoromethyl-2-fluoroaniline | 1-(4-trifluoromethyl-2-fluorophenyl)-1-methylguanidine |
| N-methyl-2,4-dichloro-6-methylaniline | 1-(2,4-dichloro-6-methylphenyl)-1-methylguanidine |
| N-methyl-2,6-dichloro-4-methylaniline | 1-(2,6-dichloro-4-methylphenyl)-1-methylguanidine |
| N-methyl-3,5-ditrifluoromethylaniline | 1-(3,5-ditrifluoromethylphenyl)-1-methylguanidine |
| N-methyl-2-trifluoromethyl-4-nitroaniline | 1-(2-trifluoromethyl-4-nitrophenyl)-1-methylguanidine |
| N-methyl-2,6-dimethyl-4-chloroaniline | 1-(2,6-dimethyl-4-chlorophenyl)-1-methylguanidine |
| N-methyl-2,6-dimethyl-4-fluoroaniline | 1-(2,6-dimethyl-4-fluorophenyl)-1-methylguanidine |
| N-methyl-2-chloro-4-nitroaniline | 1-(2-chloro-4-nitrophenyl)-1-methylquanidine |
| N-methyl-2-bromo-4-nitroaniline | 1-(2-bromo-4-nitrophenyl)-1-methylguanidine |
| N-methyl-2-fluoro-4-nitroaniline | 1-(2-fluoro-4-nitrophenyl)-1-methylguanidine |
| N-methyl-2-nitro-4-chloroaniline | 1-(2-nitro-4-chlorophenyl)-1-methylguanidine |
| N-methyl-2-nitro-4-bromoaniline | 1-(2-nitro-4-bromophenyl)-1-methylguanidine |
| N-methyl-2-nitro-4-fluoroaniline | 1-(2-nitro-4-fluorophenyl)-1-methylguanidine |
| N-methyl-2-nitro-4-trifluoromethylaniline | 1-(2-nitro-4-trifluorophenyl)-1-methylguanidine |
| N-methyl-2-nitro-4-methoxyaniline | 1-(2-nitro-4-methoxyphenyl)-1-methylguanidine |
| N-methyl-2-methyl-4-chloroaniline | 1-(2-methyl-4-chlorophenyl)-1-methylguanidine |
| N-methyl-2-methyl-4-bromoaniline | 1-(2-methyl-4-bromophenyl)-1-methylguanidine |
| N-methyl-2-methyl-4-fluoroaniline | 1-(2-methyl-4-flurophenyl)-1-methylguanidine |
| N-methyl-2-chloro-4-methylaniline | 1-(2-chloro-4-methylphenyl)-1-methylguanidine |
| N-methyl-2-bromo-4-methylaniline | 1-(2-bromo-4-methylphenyl)-1-methylguanidine |
| N-methyl-2-fluoro-4-methylaniline | 1-(2-fluoro-4-methylphenyl)-1-methylguanidine |
| N-methyl-2-cyano-4-methylaniline | 1-(2-cyano-4-methylphenyl)-1-methylguanidine |
| N-methyl-2-trifluoromethyl-4-methylaniline | 1-(2-trifluoromethyl-4-methylphenyl)-1-methylguanidine |
| N-methyl-2-methyl-4-nitroaniline | 1-(2-methyl-4-nitrophenyl)-1-methylguanidine |
| N-methyl-2-methyl-4-cyanoaniline | 1-(2-methyl-4-cyanophenyl)-1-methylguanidine |
| N-methyl-2-methyl-4-trifluoromethylaniline | 1-(2-methyl-4-trifluoromethylphenyl)-1-methylguanidine |

TABLE I -Continued

| | |
|---|---|
| N-methyl-2-chloro-6-nitroaniline | 1-(2-chloro-6-nitrophenyl)-1-methylguanidine |
| N-methyl-2-bromo-6-nitroaniline | 1-(2-bromo-6-nitrophenyl)-1-methylguanidine |
| N-methyl-2-iodo-6-nitroaniline | 1-(2-iodo-6-nitrophenyl)-1-methylguanidine |
| N-methyl-2-fluoro-6-nitroaniline | 1-(2-fluoro-6-nitrophenyl)-1-methylguanidine |
| N-methyl-2-nitro-6-trifluoromethylaniline | 1-(2-nitro-6-trifluoromethylphenyl)-1-methyl1 guanidine |
| N-methyl-2-nitro-6-methoxyaniline | 1-(2-nitro-6-methoxyphenyl)-1-methylguanidine |
| N-methyl-2,6-dimethyl-4-bromoaniline | 1-(2,6-dimethyl-4-bromophenyl)-1-methylguanidine |
| N-methyl-2,6-dimethyl-4-nitroaniline | 1-(2,6-dimethyl-4-nitrophenyl)-1-methylguanidine |
| N-methyl-2,6-dimethyl-4-trifluoromethylaniline | 1-(2,6-dimethyl-4-trifluoromethylphenyl)-1-methylguanidine |
| NN-methyl-2-ethyl-4-nitroaniline | 1-(2-ethyl-4-nitrophenyl)-1-methylguanidine |
| N-methyl-2-ethyl-4-chloroaniline | 1-(2-ethyl-4-chlorophenyl)-1-methylguanidine |
| N-methyl-2-ethyl-4-bromoaniline | 1-(2-ethyl-4-bromophenyl)-1-methylguanidine |
| N-methyl-2-ethyl-4-fluoroaniline | 1-(2-ethyl-4-fluorophenyl)-1-methylguanidine |
| N-methyl-2-ethyl-4-trifluoromethylaniline | 1-(2-ethyl-4-trifluoromethylphenyl)-1-methylguanidine |
| N-methyl-2-ethyl-4-cyanoaniline | 1-(2-ethyl-4-cyanophenyl)-1-methylguanidine |
| N-methyl-2-ethyl-4-methylsulfonylaniline | 1-(2-ethyl-4-methylsulfonylphenyl)-1-methylguanidine |
| N-methyl-2,4-dichloro-6-bromoaniline | 1-(2,4-dichloro-6-bromophenyl)-1-methyl guanidine |
| N-methyl-2,6-dichloro-4-bromoaniline | 1-(2,6-dichloro-4-bromophenyl)-1-methylguanidine |
| N-methyl-2,4-dibromo-6-chloroaniline | 1-(2,4-dibromo-6-chlorophenyl)-1-methylguanidine |
| N-methyl-2,6-dibromo-4-chloroaniline | 1-(2,6-dibromo-4-chlorophenyl)-1-methylguanidine |
| N-methyl-2,4-dichloro-6-fluoroaniline | 1-(2,4-dichloro-6-fluorophenyl)-1-methylguanidine |
| N-methyl-2,6-dichloro-4-fluoroaniline | 1-(2,6-dichloro-4-fluorophenyl)-1-methylguanidine |
| N-methyl-2,5-dichloro-4-fluoroaniline | 1-(2,5-dichloro-4-fluorophenyl)-1-methylguanidine |
| N-methyl-2,6-dichloro-4-iodoaniline | 1-(2,6-dichloro-4-iodophenyl)-1-methylguanidine |
| N-methyl-2,4-dibromo-6-fluoroaniline | 1-(2,4-dibromo-6-fluorophenyl)-1-methylguanidine |
| N-methyl-2,6-dibromo-4-fluoroaniline | 1-(2,6-dibromo-4-fluorophenyl)-1-methylguanidine |
| N-methyl-2-chloro-4-bromo-6-fluoroaniline | 1-(2-chloro-4-bromo-6-fluorophenyl)-1-methylguanidine |
| N-methyl-2-bromo-4-fluoro-6-chloroaniline | 1-(2-bromo-4-fluoro-6-chlorophenyl)-1-methylguanidine |
| N-methyl-2-bromo-4-chloro-6-fluoroaniline | 1-(2-bromo-4-chloro-6-fluorophenyl)-1-methylguanidine |
| N-methyl-2-chloro-4-iodo-6-bromoaniline | 1-(2-chloro-4-iodo-6-bromophenyl)-1-methylguanidine |
| N-methyl2,4,6-tribromoaniline | 1-(2,4,6-tribromophenyl)-1-methylguanidine |
| N-methyl-2,4,6-trifluoroaniline | 1-(2,4,6-trifluorophenyl)-1-methylguanidine |
| N-ethyl-2,6-dichloroaniline | 1-(2,6-dichlorophenyl)-1-ethylguanidine |
| N-ethyl-2,4-dichloroaniline | 1-(2,4-dichlorophenyl)-1-ethylguanidine |
| N-ethyl-p-fluoroaniline | 1-(p-fluorophenyl)-1-ethylguanidine |
| N-propyl-p-fluoroaniline | 1-(p-fluorophenyl)-1-propylguanidine |
| N-i-propyl-p-fluoroaniline | 1-(p-fluorophenyl)-1-i-propylguanidine |
| N-butyl-p-fluoroaniline | 1-(p-fluorophenyl)-1-butylguanidine |

EXAMPLE 3

1-(2,6-Dichlorophenyl)-3-methylguanidine

To 51 g (0.315 mole) of 2,6-dichloroaniline is added 0.4 mole of ethereal HCl and 200 ml of m-cresol. The mixture is then stirred and heated on a steam bath to drive off the ether and excess hydrogen chloride. To the resultant mixture is then added 17.7 g (0.315 mole) of methyl cyanamide then heated for 2 hours on a steam bath. The reaction mixture is then cooled, added to 150 ml of conc. sodium hydroxide solution, cooled and extracted with 2 liters of ether. The ether layer is washed with 2 × 1 liter of water, dried over sodium sulfate, charcoaled and evaporated. The residue is triturated with hexane and the precipitate is filtered off and washed with ether and dried to obtain 1-(2,6-dichlorophenyl)-3-methylguanidine hydrochloride.

The free base is prepared by dissolving 1-(2,6-dichlorophenyl)-3-methylguanidine hydrochloride in 10% sodium hydroxide solution and extracting with ether. The ether is dried and evaporated to dryness to obtain 1-(2,6-dichlorophenyl)-3-methylguanidine.

When the above procedures are followed using the cyanamides of Table I, below, then the corresponding products are prepared.

TABLE I ethylcyanamide
propylcyanamide
i-propylcyanamide
butylcyanamide
pentylcyanamide
hexylcyanamide
heptylcyanamide
octylcyanamide
propargylcyanamide
methallylcyanamide
2,4-pentadienylcyanamide
cyclopropylcyanamide
cyclobutylcyanamide
cyclopentylcyanamide
cyclohexylcyanamide
acetylcyanamide TABLE I -Continued propionylcyanamide
benzoylcyanamide
phenylcyanamide
benzylcyanamide
phenethylcyanamide
cyclohex-2-enylcyanamide
cyclopropylmethylcyanamide
cyclobutylmethylcyanamide
cyclopropylethylcyanamide
diethylcyanamide
methylethylcyanamide
methylpropylcyanamide
methylcyclopropylcyanamide
methylbenzylcyanamide
methylacetylcyanamide
ethylacetylcyanamide When the anilines of Examples 1 and 2 are condensed with the above cyanamides using the above procedures, then the corresponding products are obtained.

EXAMPLE 4

1-(2,6-Dichlorophenyl)-3-acetylguanidine

A solution of 5 g (0.024 mole) of 2,6-dichlorophenylguanidine in 50 ml of tetrahydrofuran is chilled in an ice bath while 2.56 g (0.24 mole) of acetic anhydride is added dropwise. The mixture is then stirred for 48 hours and then poured into 1 liter of water. The mixture is then stirred for 8 hours and the precipitate is collected to obtain 1-(2,6-dichlorophenyl)-1,3-diacetylguanidine 3 g of this material is stirred at room temperature with 15 ml of conc. hydrochloric acid. The reaction mixture is poured into ice and basicified with cold conc. sodium hydroxide solution. The precipitate is cooled and recrystallized from ethanol: water to obtain 1-(2,6-dichlorophenyl)-3-acetylguanidine.

When acetic anhydride is replaced by propionic anhydride, butyric anhydride, benzoic anhydride, then the products obtained are:

1-(2,6-dichlorophenyl)-3-propionylguanidine
1-(2,6-dichlorophenyl)-3-butyroylguanidine
1-(2,6-dichlorophenyl)-3-benzoylguanidine When the above procedures are followed using the anilines of Examples 1 and 2 and the above anhydrides then the corresponding products are obtained.

EXAMPLE 5

1-(p-Fluorophenyl)-3-methylthiourea

To a mixture of 55.5 g (0.5 mole) of p-fluoroaniline and 100 ml of xylene is added 36.5 g (0.5 mole) of methylisothiocyanate and the mixture is refluxed for 2 hours. Recrystallization from 1:1 isopropanol/water results in 1-(p-fluorophenyl)-3-methylthiourea.

When the above procedure is followed using the anilines of Examples 1 and 2 then the corresponding product is obtained.

When methylisothiocyanate is replaced by the isothiocyanates of Table I, below, then the corresponding products are obtained.

TABLE I ethylisocyanate
propylisothiocyanate
i-propylisothiocyanate

TABLE I -Continued butylisothiocyanate
pentylisothiocyanate
hexylisothiocyanate
octylisothiocyanate
propargylisothiocyanate
methallylisothiocyanate
cyclopropylisothiocyanate
cyclobutylisothiocyanate
cyclopentylisothiocyanate
cyclohexylisothiocyanate
cyclohex-2-enylisothiocyanate
acetylisothiocyanate
propionylisothiocyanate
benzoylisothiocyanate
phenylisothiocyanate
benzylisothiocyanate
phenethylisothiocyanate
cyclopropylmethyliosthiocyanate
cyclobutylmethylisothiocyanate
cyclopropylethylisothiocyanate

EXAMPLE 6

1-(2,6-Dichlorophenyl)-3-methylguanidine

To 51.8 g (0.68 mole) of ammonium thiocyanate in 300 ml acetone is added 86.8 g (0.62 mole) of benzoyl chloride. The reaction mixture is refluxed for about 5 minutes and then 100 g (0.62 mole) of 2,6-dichloro aniline in 200 ml acetone is added at a rate to maintain reflux. The mixture is refluxed for 1½ hours, cooled, poured into 1½ liter of ice and water, filtered to obtain 1-(2,6-dichlorophenyl)-3-benzoylthiourea.

182.8 g (0.56 mole) of the latter is heated with 1 liter of 10% sodium hydroxide, filtered, acidified while hot with conc. hydrochloric acid and then made basic with conc. ammonium hydroxide. The mixture is then chilled in an ice both and the resultant 2,6-dichlorophenylthiourea is filtered off.

20 g (0.09 mole) of 2,6-dichlorphenylthiourea is combined with 200 ml methanol and 12.9 g (0.09 mole) iodomethane and refluxed for 4 hours. This is then evaporated to dryness and 100 ml hexane is added and the mixture filtered to obtain 1-(2,6-dichlorophenyl)-2-methyl-pseudothiouronium iodide.

32.8 g (0.09 mole) of the latter is added to 300 ml of n-butanol. Methyl amine gas is bubbled through this solution while refluxing for 24 hours. The reaction mixture is evaporated to dryness and extracted with 10% sodium hydroxide solution and ether. The ether is washed with 10% sodium hydroxide and then with water, dried and filtered. To this is added ethereal HCl and the precipitate is collected to obtain 1-(2,6-dichlorophenyl)-3-methylguanidine hydrochloride.

The free base is prepared by dissolving 1-(2,6-dichlorphenyl)-3-methylguanidine hydrochloride in 10% sodium hydroxide solution and extracting with ether. The ether is dried and evaporated to dryness to obtain 1-(2,6-dichlorophenyl)-3-methylguanidine.

When the above procedures are followed using the anilines of Examples 1 and 2 then the corresponding products are obtained.

When the above procedures are followed and methylamine is replaced with the amines of Table I, below, then the corresponding products are obtained.

TABLE I ethylamine
propylamine
i-propylamine
butylamine
pentylamine
hexylamine
heptylamine
octylamine
propargylamine
methallylamine
2,4-pentadienylamine
cyclopropylamine
cyclobutylamine
cyclopentylamine
cyclohexylamine
aniline
benzylamine
phenethylamine
cyclohex-2-enylamine
cyclopropylmethylamine

TABLE I -Continued cyclobutylmethylamine
cyclopropylethylamine
dimethylamine
diethylamine
methylethylamine
ethylpropylamine
ethylcyclopropylamine
ethylbenzylamine
dibenzylamine
N-benzylaniline
azirane
azetidine
piperidine
homopiperidine
morpholine
pyrrolidine
piperazine
2-methyl-1-azacyclooctane When the above procedures are followed using the anilines of Examples 1 and 2 and the amines of Table I, above, then the corresponding products are obtained.

EXAMPLE 7

Following the procedures of Example 1–6, the following representative compounds may be prepared:

| Starting Materials | Product | Ex. |
|---|---|---|
| 2,6-dichloroaniline + ethylcyanamide | 1-(2,6-dichlorophenyl)-3-ethylguanidine | 3 |
| 2,6-dichloroaniline + propylcyanimide | 1-(2-6-dichlorophenyl)-3-propylguanidine | 3 |
| 2,6-dichloroaniline + i-propylcyanamide | 1-(2,6-dichlorophenyl)-3-i-propylguanidine | 3 |
| 2,6-dichloroaniline + butylcyanamide | 1-(2,6-dichlorophenyl)-3-butylguanidine | 3 |
| 2,6-dichloroaniline + pentylcyanamide | 1-(2,6-dichlorophenyl)-3-pentylguanidine | 3 |
| 2,6-dichloroaniline + hexylcyanamide | 1-(2,6-dichlorophenyl)-3-hexylguanidine | 3 |
| 2,6-dichloroaniline + heptylcyanamide | 1-(2,6-dichlorophenyl)-3-heptylguanidine | 3 |
| 2,6-dichloroaniline + octylcyanamide | 1-(2,6-dichlorophenyl)-3-octylguanidine | 3 |
| 2,6-dichloroaniline + alkylcyanamide | 1-(2,6-dichlorophenyl)-3-alkylguanidine | 3 |
| 2,6-dichloroaniline + propargylcyanamide | 1-(2,6-dichlorophenyl)-3-propargylguanidine | 3 |
| 2,6-dichloroaniline + methallylcyanamide | 1-(2,6-dichlorophenyl)-3-methallylguanidine | 3 |
| 2,6-dichloroaniline + (2,4-pentadienyl)cyanamide | 1-(2,6-dichlorophenyl)-3-(2,4-pentadienyl)guanidine | 3 |
| 2,6-dichloroaniline + cyclopropylcyanamide | 1-(2,6-dichlorophenyl)-3-cyclopropylguanidine | 3 |
| 2,6-dichloroaniline + cyclobutylcyanamide | 1-(2,6-dichlorophenyl)-3-cyclobutylguanidine | 3 |
| 2,6-dichloroaniline + cyclopentylcyanamide | 1-(2,6-dichlorophenyl)-3-cyclopentylguanidine | 3 |
| 2,6-dichloroaniline + cyclohexylcyanamide | 1-(2,6-dichlorophenyl)-3-cyclohexylguanidine | 3 |
| 1-(2,6-dichlorophenyl) guanidine + acetic anhydride | 1-(2,6-dichlorophenyl)-3-acetylguanidine | 4 |
| 1-(2,6-dichlorophenyl)guanidine + propionic anhydride | 1-(2,6-dichlorophenyl)-3-propionylguanidine | 4 |
| 1-(2,6-dichlorophenyl)guanidine + benzoic anhydride | 1-(2,6-dichlorophenyl)-3-benzoylguanidine | 4 |
| 2,6-dichloroaniline + phenylcyanamide | 1-(2,6-dichlorophenyl)-3-phenylguanidine | 3 |
| 2,6-dichloroaniline + benzylcyanamide | 1-(2,6-dichlorophenyl)-3-benzylguanidine | 3 |
| 2,6-dichloroaniline + phenethylcyanamide | 1-(2,6-dichlorophenyl)-3-phenethylguanidine | 3 |
| 2,6-dichloroaniline + (cyclohex-2-enyl)cyanamide | 1-(2,6-dichlorophenyl)-3-(cyclohex-2-enyl)guanidine | 3 |
| 2,6-dichloroaniline + cyclopropylmethylcyanamide | 1-(2,6-dichlorophenyl)-3-cyclopropylmethylguanidine | 3 |
| 2,6-dichloroaniline + cyclopropylethylcyanamide | 1-(2,6-dichlorophenyl)-3-cyclopropylethylguanidine | 3 |
| 1-(2,6-dichlorophenyl)-2-methylpseudothiouronium iodide + diethylamine | 1-(2,6-dichlorophenyl)-3,3-diethylguanidine | 6 |
| 1-(2,6-dichlorophenyl)-2-methylpseudothiouronium iodide + methylethylamine | 1-(2,6-dichlorophenyl)-3-methyl-3-ethylguanidine | 6 |
| 1-(2,6-dichlorophenyl)-2-methylpseudothiouronium iodide + methylpropylamine | 1-(2,6-dichlorophenyl)-3-methyl-3-propylguanidine | 6 |
| 1-(2,6-dichlorophenyl)-2-methylpseudothiouronium iodide + methyl(cyclopropyl)amine | 1-(2,6-dichlorophenyl)-3-methyl-3-cyclopropylguanidine | 6 |
| 1-(2,6-dichlorophenyl)-2-methylpseudothiouronium iodide + N-methylbenzylamine | 1-(2,6-dichlorophenyl)-3-methyl-3-benzylguanidine | 6 |
| 1-(2,6-dichlorophenyl)-2-methylpseudothiouronium iodide + N-lithio-N-methylacetanide | 1-(2,6-dichlorophenyl)-3-methyl-3-acetylguanidine | 6 |
| 1-(2,6-dichlorophenyl)-2-methylpseudothiouronium iodide + N-lithio-N-ethylacetanide | 1-(2,6-dichlorophenyl)-3-ethyl-3-propionylguanidine | 6 |
| N-methyl-2,6-dichloroaniline + methylcyanamide | 1-(2,6-dichlorophenyl)-1,3-dimethylguanidine | 2 |
| N-ethyl-2,6-dichloroaniline + ethylcyanamide | 1-(2,6-dichlorophenyl)-1,3-diethylguanidine | 2 |
| N-methyl-2,6-dichloroaniline + ethylcyanamide | 1-(2,6-dichlorophenyl)-1-methyl-3-ethylguanidine | 2 |
| N-ethyl-2,6-dichloroaniline + methylcyanamide | 1-(2,6-dichlorophenyl)-1-ethyl-3-methylguanidine | 2 |
| 1-(2,6-dichlorophenyl)-1,2,3-trimethylpseudothiouronium iodide + methylamine | 1-(2,6-dichlorophenyl)-1,2,3-trimethylguanidine | 6 |
| 1-(2,6-dichlorophenyl)-N-methylaniline + dimethylcyanamide | 1-(2,6-dichlorophenyl)-1,3,3-trimethylguanidine | 3 |
| 1-(2,6-dichlorophenyl)-2-methylpseudothiouronium iodide + octamethyleneimine | 1-(2,6-dichlorophenyl)-3,3-octamethyleneguanidine | 6 |
| 1-(2,6-dichlorophenyl)-2-methylpseudothiouronium iodide + thiomorpholine | N-(2,6-dichlorophenylamidino)thiomorpholine | 6 |
| 1-(2,6-dichlorophenyl)-2-methylpseudothiouronium iodide + piperidine | 1-(2,6-dichlorophenyl)-3,3-pentamethyleneguanidine | 6 |
| 1-(2,6-dichlorophenyl)-2-methylpseudothiouronium iodide + morpholine | N-(2,6-dichlorophenylamidino)morpholine | 6 |
| 1-(2,6-dichlorophenyl-2-methylpseudothiouronium iodide + N-methylpiperazine | N'-(2,6-dichlorophenylamidino)-N²-methylpiperazine | 6 |
| 1-(2,6-dichlorophenyl)-N-methylaniline + dimethylcyanamide | 1-(2,6-dichlorophenyl)-1,3,3-trimethylguanidine | 3 |

EXAMPLE 7—Continued

Following the procedures of Example 1–6, the following representative compounds may be prepared:

| Starting Materials | Product | Ex. |
|---|---|---|
| 1-(2,6-dichlorophenyl)-N-methylaniline + diethylcyanamide | 1-(2,6-dichlorophenyl)-1-methyl-3,3-diethylguanidine | 3 |
| 1-(2,6-dichlorophenyl)-1,2,3,3-tetramethylpseudothiouronium iodide + methylamine | 1-(2,6-dichlorophenyl)-1,2,3,3-tetramethylguanidine | 6 |
| 1-(2,6-dichlorophenyl)-1-methyl-3-acetylpseudothiouronium iodide + diethylamine | 1-(2,6-dichlorophenyl)-1-methyl-2-acetyl-3,3-diethylguanidine | 6 |
| 1-(2,6-dichlorophenyl)-1-methyl-3-acetylpseudothiouronium iodide + ethylamine | 1-(2,6-dichlorophenyl)-1-methyl-2-acetyl-3-ethylguanidine | 6 |
| p-fluoroaniline + methylcyanamide | 1-(p-fluorophenyl)-3-methylguanidine | 3 |
| p-fluoroaniline + ethylcyanamide | 1-(p-fluorophenyl)-3-ethylguanidine | 3 |
| p-fluoroaniline + propylcyanamide | 1-(p-fluorophenyl)-3-propylguanidine | 3 |
| p-fluoroaniline + i-propylcyanamide | 1-(p-fluorophenyl)-3-i-propylguanidine | 3 |
| p-fluoroaniline + butylcyanamide | 1-(p-fluorophenyl)-3-butylguanidine | 3 |
| 1-(p-fluorophenyl)-2-methylpseudothiouronium iodide + octamethyleneimine | 1-(p-fluorophenyl)-3,3-octamethyleneguanidine | 6 |
| 1-(p-fluorophenyl)-2-methylpseudothiouronium iodide + thiomorphine | N-(p-fluorophenylamidino)-thiomorphine | 6 |
| p-fluoroaniline + cyclopropylcyanamide | 1-(p-fluorophenyl)-3-cyclopropylguanidine | 3 |
| p-fluorophenylguanidine + acetic anhydride | 1-(p-fluorophenyl)-3-acetylguanidine | 4 |
| p-fluorophenylguanidine + propionic anhydride | 1-(p-fluorophenyl)-3-propionylguanidine | 4 |
| p-fluoroaniline + benzylcyanamide | 1-(p-fluorophenyl)-3-benzylguanidine | 3 |
| p-fluoroaniline + cyclopropylmethylcyanamide | 1-(p-fluorophenyl)-3-cyclopropylmethylguanidine | 3 |
| 1-(p-fluorophenyl)-2-methylpseudothiouronium iodide + diethylamine | 1-(p-fluorophenyl)-3,3-diethylguanidine | 6 |
| 1-(p-fluorophenyl)-3-acetyl-2-methylpseudothiouronium iodide + methylamine | 1-(p-fluorophenyl)-2-methyl-3-acetylguanidine | 6 |
| 1-(p-fluorophenyl)-3-acetyl-2-methylpseudothiouronium iodide + ethylamine | 1-(p-fluorophenyl)-2-ethyl-3-acetylguanidine | 6 |
| 1-(p-fluorophenyl)-1-methylguanidine + acetic anhydride | 1-(p-fluorophenyl)-1-methyl-3-acetylguanidine | 4 |
| 1-(p-fluorophenyl)-1,2-dimethylpseudothiouronium iodide + diethylamine | 1-(p-fluorophenyl)-1-methyl-3,3-diethylguanidine | 6 |
| p-fluoro-N-methylaniline + t-butylcyanamide | 1-(p-fluorophenyl)-1-methyl-3-t-butylguanidine | 3 |
| 1-(p-chlorophenyl)guanidine + acetic anhydride | 1-(p-chlorophenyl)-3-acetylguanidine | 4 |
| 1-(2,4-dichlorophenyl)guanidine + acetic anhydride | 1-(2,4-dichlorophenyl)-3-acetylguanidine | 4 |
| 1-(3,5-dichlorophenyl)guanidine + acetic anhydride | 1-(3,5-dichlorophenyl)-3-acetylguanidine | 4 |
| 1-(2,4,6-trichlorophenyl)guanidine + acetic anhydride | 1-(2,4,6-trichlorophenyl)-3-acetylguanidine | 4 |
| 1-(p-bromophenyl)guanidine + acetic anhydride | 1-(p-bromophenyl)-3-acetylguanidine | 4 |
| 1-(2,4-dibromophenyl)guanidine + acetic anhydride | 1-(2,4-dibromophenyl)-3-acetylguanidine | 4 |
| 1-(2,5-dibromophenyl)guanidine + acetic anhydride | 1-(2,5-dibromophenyl)-3-acetylguanidine | 4 |
| 1-(2-chloro-3-bromophenyl)guanidine + acetic anhydride | 1-(2-chloro-3-bromophenyl)-3-acetylguanidine | 4 |
| 1-(2-chloro-4-bromophenyl)guanidine + acetic anhydride | 1-(2-chloro-4-bromophenyl)-3-acetylguanidine | 4 |
| 1-(2-chloro-6-bromophenyl)guanidine + acetic anhydride | 1-(2-chloro-6-bromophenyl)-3-acetylguanidine | 4 |
| 1-(4-chloro-2-bromophenyl)guanidine + acetic anhydride | 1-(4-chloro-2-bromophenyl)-3-acetylguanidine | 4 |
| 1-(2-fluoro-4-chlorophenyl)guanidine + acetic anhydride | 1-(2-fluoro-4-chlorophenyl)-3-acetylguanidine | 4 |
| 1-(2-fluoro-6-chlorophenyl)guanidine + acetic anhydride | 1-(2-fluoro-6-chlorophenyl)-3-acetylguanidine | 4 |
| 1-(2-bromo-4-fluorophenyl)guanidine + acetic anhydride | 1-(2-bromo-4-fluorophenyl)-3-acetylguanidine | 4 |
| 1-(o-fluorophenyl)guanidine + acetic anhydride | 1-(o-fluorophenyl)-3-acetylguanidine | 4 |
| 1-(p-iodophenyl)guanidine + acetic anhydride | 1-(p-iodophenyl)-3-acetylguanidine | 4 |
| 1-(2,4-difluorophenyl)guanidine + acetic anhydride | 1-(2,4-difluorophenyl)-3-acetylguanidine | 4 |
| 1-(p-trifluoromethylphenyl)guanidine + acetic anhydride | 1-(p-trifluoromethylphenyl)-3-acetylguanidine | 4 |
| 1-(p-trifluoromethoxyphenyl)guanidine + acetic anhydride | 1-(p-trifluoromethoxyphenyl)-3-acetylguanidine | 4 |
| 1-(p-methylsulfonylphenyl)guanidine + acetic anhydride | 1-(p-methylsulfonylphenyl)-3-acetylguanidine | 4 |
| 1-(p-nitrophenyl)guanidine + acetic anhydride | 1-(p-nitrophenyl)-3-acetylguanidine | 4 |
| 1-(2-chloro-4-nitrophenyl)guanidine + acetic anhydride | 1-(2-chloro-4-nitrophenyl)-3-acetylguanidine | 4 |
| 1-(2-fluoro-4-nitrophenyl)guanidine + acetic anhydride | 1-(2-fluoro-4-nitrophenyl)-3-acetylguanidine | 4 |
| 1-(2-methyl-4-chlorophenyl)guanidine + acetic anhydride | 1-(2-methyl-4-chlorophenyl)-3-acetylguanidine | 4 |
| 1-(2-methyl-4-bromophenyl)guanidine + acetic anhydride | 1-(2-methyl-4-bromophenyl)-3-acetylguanidine | 4 |
| 1-(2-methyl-4-fluorophenyl)guanidine + acetic anhydride | 1-(2-methyl-4-fluorophenyl)-3-acetylguanidine | 4 |
| 1-(2-chloro-4-methylphenyl)guanidine + acetic anhydride | 1-(2-chloro-4-methylphenyl)-3-acetylguanidine | 4 |
| 1-(2-bromo-4-methylphenyl)guanidine + acetic anhydride | 1-(2-bromo-4-methylphenyl)-3-acetylguanidine | 4 |
| 1-(2-fluoro-4-methylphenyl)guanidine + acetic anhydride | 1-(2-fluoro-4-methylphenyl)-3-acetylguanidine | 4 |
| 1-(2-methyl-4-nitrophenyl)guanidine + acetic anhydride | 1-(2-methyl-4-nitrophenyl)-3-acetylguanidine | 4 |
| 1-(2-methyl-4-trifluoromethylphenyl)guanidine + acetic anhydride | 1-(2-methyl-4-trifluoromethylphenyl)-3-acetylguanidine | 4 |
| 1-(2-methyl-6-chlorophenyl)guanidine + acetic anhydride | 1-(2-methyl-6-chlorophenyl)-3-acetylguanidine | 4 |
| 1-(2-methyl-6-bromophenyl)guanidine + acetic anhydride | 1-(2-methyl-6-bromophenyl)-3-acetylguanidine | 4 |
| 1-(2,4-dimethylphenyl)guanidine + acetic anhydride | 1-(2,4-dimethylphenyl)-3-acetylguanidine | 4 |
| 1-(2,6-dimethylphenyl)guanidine + acetic anhydride | 1-(2,6-dimethylphenyl)-3-acetylguanidine | 4 |
| 1-(2-chloro-4-trifluoromethylphenyl)guanidine + acetic anhydride | 1-(2-chloro-4-trifluoromethylphenyl)-3-acetylguanidine | 4 |
| 1-(2-bromo-4-trifluoromethylphenyl)guanidine + acetic anhydride | 1-(2-bromo-4-trifluoromethylphenyl)-3-acetylguanidine | 4 |
| 1-(3,5-ditrifluoromethylphenyl)guanidine + acetic anhydride | 1-(3,5-ditrifluoromethylphenyl)-3-acetylguanidine | 4 |
| 1-(2,6-dimethyl-4-chlorophenyl)guanidine + acetic anhydride | 1-(2,6-dimethyl-4-chlorophenyl)-3-acetylguanidine | 4 |
| 1-(2,6-dimethyl-4-fluorophenyl)guanidine + acetic anhydride | 1-(2,6-dimethyl-4-fluorophenyl)-3-acetylguanidine | 4 |
| 1-(2,6-dimethyl-4-nitrophenyl)guanidine + acetic anhydride | 1-(2,6-dimethyl-4-nitrophenyl)-3-acetylguanidine | 4 |
| 1-(2,6-dimethyl-4-trifluoromethylphenyl)guanidine + acetic anhydride | 1-(2,6-dimethyl-4-trifluoromethylphenyl)-3-acetylguanidine | 4 |
| 1-(2-ethyl-4-nitrophenyl)guanidine + acetic anhydride | 1-(2-ethyl-4-nitrophenyl)-3-acetylguanidine | 4 |
| 1-(2-ethyl-4-chlorophenyl)guanidine + acetic anhydride | 1-(2-ethyl-4-chlorophenyl)-3-acetylguanidine | 4 |
| 1-(2-ethyl-4-bromophenyl)guanidine + acetic anhydride | 1-(2-ethyl-4-bromophenyl)-3-acetylguanidine | 4 |
| 1-(2-ethyl-4-fluorophenyl)guanidine + acetic anhydride | 1-(2-ethyl-4-fluorophenyl)-3-acetylguanidine | 4 |
| 1-(2-ethyl-4-trifluoromethylphenyl)guanidine + acetic anhydride | 1-(2-ethyl-4-trifluoromethylphenyl)-3-acetylguanidine | 4 |
| 1-(2,4-dichloro-6-bromophenyl)guanidine + acetic anhydride | 1-(2,4-dichloro-6-bromophenyl)-3-acetylguanidine | 4 |
| 1-(2,4-dichloro-6-methylphenyl)guanidine + acetic anhydride | 1-(2,4-dichloro-6-methylphenyl)-3-acetylguanidine | 4 |
| 1-(2,6-dichloro-4-bromophenyl)guanidine + acetic anhydride | 1-(2,6-dichloro-4-bromophenyl)-3-acetylguanidine | 4 |
| 1-(2,6-dichloro-4-methylphenyl)guanidine + acetic anhydride | 1-(2,6-dichloro-4-methylphenyl)-3-acetylguanidine | 4 |
| 1-(2,6-dichloro-4-fluorophenyl)guanidine + acetic anhydride | 1-(2,6-dichloro-4-fluorophenyl)-3-acetylguanidine | 4 |
| 1-(2,4-dichloro-4-ethylphenyl)guanidine + acetic anhydride | 1-(2,4-dichloro-4-ethylphenyl)-3-acetylguanidine | 4 |

EXAMPLE 7—Continued

Following the procedures of Example 1–6, the following representative compounds may be prepared:

| Starting Materials | Product | Ex. |
|---|---|---|
| 1-(2-chloro-4-fluoro-6-methylphenyl)guanidine + acetic anhydride | 1-(2-chloro-4-fluoro-6-methylphenyl)-3-acetylguanidine | 4 |
| 1-(2,6-dichlorophenyl)-3-acetylguanidine + acetic anhydride | 1-(2,6-dichlorophenyl)-2,3-diacetylguanidine | 4 |
| p-trifluoromethyl-N-methylaniline + cyanamide | 1-(p-trifluoromethylphenyl)-1-methylguanidine | 2 |
| 1-(2,4-dichlorophenyl)-2-methylpseudothiouronium iodide + diethylamine | 1-(2,4-dichlorophenyl)-3,3-diethylguanidine | 6 |
| 1-(2,4,6-trichlorophenyl)-1-methylguanidine + acetic anhydride | 1-(2,4,6-trichlorophenyl)-1-methyl-3-acetylguanidine | 4 |
| 1-(p-bromophenyl)-3-acetylpseudothiouronium iodide + diethylamine | 1-(p-bromophenyl)-2-acetyl-3,3-diethylguanidine | 6 |
| 2,4-difluoro-N-methylaniline + cyanamide | 1-(2,4-difluorophenyl)-1-methylguanidine | 2 |
| p-nitroaniline + t-butylcyanamide | 1-(p-nitrophenyl)-3-t-butylguanidine | 3 |
| 1-(2-methyl-4-nitrophenyl)-1-methylguanidine + acetic | 1-(2-methyl-4-nitrophenyl)1-methyl-3-acetylguanidine | 4 |
| 1-(2-methyl-4-chlorophenyl)-3-ethyl-2-methylpseudothiouronium iodide + ethylamine | 1-(2-methyl-4-chlorophenyl)-2,3-diethylguanidine | 6 |
| 1-(2,6-dimethyl-4-chlorophenyl)-1,2-dimethylpseudothiouronium iodide + ethylamine | 1-(2,6-dimethyl-4-chlorophenyl)-1-methyl-3-ethylguanidine | 6 |
| 1-(2-methyl-6-chlorophenyl)-1-methylguanidine + acetic anhydride | 1-(2-methyl-6-chlorophenyl)-1-methyl-3-acetylguanidine | 4 |
| 1-(2-methyl-6-chlorophenyl)-2-methyl-3-acetylpseudothiouronium iodide + ethylamine | 1-(2-methyl-6-chlorophenyl)-2-acetyl-3-ethylguanidine | 6 |
| 1-(2-methyl-6-chlorophenyl)-2-methylthiouronium iodide + diethylamine | 1-(2-methyl-6-chlorophenyl)-3,3-diethylguanidine | 4 |
| 1-(2-methyl-6-chlorophenyl)-2-methylthiouronium iodide + dipropylamine | 1-(2-methyl-6-chlorophenyl)-3,3-dipropylguanidine | 6 |
| 2-methyl-6-chloroaniline + benzylcyanamide | 1-(2-methyl-6-chlorophenyl)-3-benzylguanidine | 3 |
| 1-(2,6-dichlorophenyl)-2-methylpseudothiouronium iodide + morpholine | N-(2,6-dichlorophenylamidino)-morpholine | 6 |
| 1-(2,6-dichlorophenyl)-2-methylpseudothiouronium iodide + thiomorpholine | N-(2,6-dichlorophenylamidino)-thiomorpholine | 6 |
| p-trifluoromethoxyaniline + cyclopropylcyanamide | 1-(p-trifluoromethoxyphenyl)-3-cyclopropylguanidine | 3 |
| p-trifluoromethylaniline + cyclopropylmethylcyanamide | 1-(p-trifluoromethylphenyl)-3-cyclopropylmethylguanidine | 3 |
| 1-(p-trifluoromethylphenyl)-1-methyl-3-acetylpseudothiouronium iodide + cyclopropylamine | 1-(p-trifluoromethylphenyl)-1-methyl-2-acetyl-3-cyclopropylguanidine | 6 |
| 1-(2-methyl-4-fluorophenyl)-1-methylguanidine + acetic anhydride | 1-(2-methyl-4-fluorophenyl)-1-methyl-3-acetylguanidine | 4 |
| 1-(2-bromo-4-chlorophenyl)-1-methylguanidine + propionic anhydride | 1-(2-bromo-4-chlorophenyl)-1-methyl-3-propionylguanidine | 4 |
| 1-(3,5-ditrifluoromethylphenyl)-1,2-dimethylpseudothiouronium iodide + cyclohexylamine | 1-3,5-ditrifluoromethylphenyl-1-methyl-3-cyclohexylguanidine | 6 |
| 2-methyl-4,6-dichloro-N-methylaniline + cyanamide | 1-(2-methyl-4,6-dichlorophenyl)-1-methylguanidine | 2 |
| 1-(2,6-dichloro-4-methylphenyl)-1-ethylguanidine + acetic anhydride | 1-(2,6-dichloro-4-methylphenyl)-1-ethyl-3-acetylguanidine | 4 |
| 1-(2,6-dichloro-4-methylphenyl)-1-propylguanidine + acetic anhydride | 1-(2,6-dichloro-4-methylphenyl)-1-propyl-3-acetylguanidine | 4 |
| 1-(2,6-dichloro-4-methylphenyl)-1,2-dimethyl-3-acetylpseudothiouronium iodide + diethylamine | 1-(2,6-dichloro-4-methylphenyl)-1-methyl-2-acetyl-3,3-diethylguanidine | 6 |
| p-methylsulfonyl-N-methylaniline + ethylcyanamide | 1-(p-methylsulfonylphenyl)-1-methyl-3-ethylguanidine | 3 |
| 2-ethyl-4-fluoroaniline + i-propylcyanamide | 1-(2-ethyl-4-fluorophenyl)-3-i-propylguanidine | 3 |
| 2-ethyl-4-chloroaniline + phenylcyanamide | 1-(2-ethyl-4-chlorophenyl)-3-phenylguanidine | 3 |
| 2-ethyl-4-fluoroaniline + methallylcyanamide | 1-(2-ethyl-4-fluorophenyl)-3-methallylguanidine | 3 |
| 2-ethyl-4-fluoroaniline + cyclohex-2-enylcyanamide | 1-(2-ethyl-4-fluorophenyl)-3-(cyclohex-2-enylguanidine | 3 |
| 2,4-dichloro-6-ethylaniline + 2,4-pentadienylcyanamide | 1-(2,4-dichloro-6-ethylphenyl)-3-(2,4-pentadienyl)guanidine | 3 |
| 2-methyl-6-chloroaniline + phenethylcyanamide | 1-(2-methyl-6-chlorophenyl)-3-phenethylguanidine | 3 |
| 2,6-dichloroaniline + 2-pentenylcyanamide | 1-(2,6-dichlorophenyl)-3-(2-pentenyl)guanidine | 3 |
| 1-(2-methyl-6-chlorophenyl)-3-acetyl-2-methylpseudothiouronium iodide + benzylamine | 1-(2-methyl-6-chlorophenyl)-2-acetyl-3-benzylguanidine | 6 |
| 2,4,6-trichloroaniline + cyclobutylmethylcyanamide | 1-(2,4,6-trichlorophenyl)-3-cyclobutylmethylguanidine | 3 |
| 1-(p-fluorophenyl)-1-methylguanidine + propionic anhydride | 1-(p-fluorophenyl)-1-methyl-3-propionylguanidine | 4 |
| 1-(p-nitrophenyl)-1-methyl-3-acetylpseudothiouronium iodide + benzylamine | 1-(p-nitrophenyl)-1-methyl-2-acetyl-3-benzylguanidine | 6 |
| 1-(2-chloro-4-fluoro-6lmethyl-)1,2-dimethyl-3-acetylpseudothiouronium iodide + piperdine | 1-(2-chloro-4-fluoro-6-methyl)-1-methyl-2-acetyl-3,3-pentamethyleneguanidine | 6 |

We claim:
1. A compound of the formula

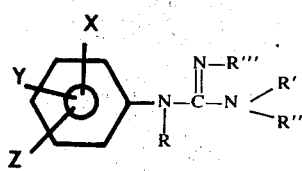

where:
X is hydrogen or halo;

Y is hydrogen, halo, haloloweralkyl, nitro, loweralkyl or loweralkoxy;

Z is haloloweralkyl, haloloweralkoxy or loweralkylsulfonyl;

Z is also halo, loweralkoxy, loweralkyl, nitro or cyano provided X and Y are not both hydrogen at the same time;

R is hydrogen or lower alkyl; R' and R''' are hydrogen, acetyl or propionyl; and R'' is acetyl or propionyl or a salt thereof of a pharmaceutically acceptable acid.

2. A compound according to claim 1 where:
X is hydrogen,
Y is 2-chloro and
Z is 6-chloro.

3. A compound according to claim 1 where R, R', and R''' are hydrogen.

4. The compound 1-(2,6-dichlorophenyl)-3-acetylguanidine.

5. The compound 1-(2,6-dichlorophenyl)-1-methyl-3-acetylguanidine.

6. The compound 1-(p-fluorophenyl)-3-acetylguanidine.

7. The compound 1-(p-fluorophenyl)-1-methyl-3-acetylguanidine.

8. The compound 1-(2,4,6-trichlorophenyl)-1-methyl-3-acetylguanidine.

* * * * *